United States Patent
Wu (10) Patent No.: US 10,197,843 B2
(45) Date of Patent: Feb. 5, 2019

(54) ARRAY SUBSTRATE, COLOR FILM SUBSTRATE, AND DISPLAY DEVICE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 0 days.

(21) Appl. No.: 14/355,435

(22) PCT Filed: Dec. 13, 2013

(86) PCT No.: PCT/CN2013/089389
§ 371 (c)(1),
(2) Date: Apr. 30, 2014

(87) PCT Pub. No.: WO2015/018157
PCT Pub. Date: Feb. 12, 2015

(65) Prior Publication Data
US 2016/0011455 A1    Jan. 14, 2016

(30) Foreign Application Priority Data

Aug. 7, 2013    (CN) .......................... 2013 1 0340451

(51) Int. Cl.
*G02F 1/136*    (2006.01)
*G02F 1/1335*    (2006.01)
(Continued)

(52) U.S. Cl.
CPC ...... *G02F 1/133514* (2013.01); *G02F 1/1368* (2013.01); *G02F 1/13439* (2013.01);
(Continued)

(58) Field of Classification Search
CPC ... G02F 2001/133757; G02F 1/133753; G02F 2001/133562; G02F 1/133514; G02F 1/133512; G02F 1/13439; G02F 1/1368
(Continued)

(56) References Cited

U.S. PATENT DOCUMENTS

2006/0066794 A1    3/2006    Hotta et al.
2011/0304808 A1    12/2011    Jeong et al.
(Continued)

FOREIGN PATENT DOCUMENTS

CN    1755460 A    4/2006
CN    100380209 C    4/2008
(Continued)

OTHER PUBLICATIONS

Chinese First Office Action dated May 6, 2015, Application No. 201310340451.5, 9 Pages.
(Continued)

*Primary Examiner* — Nathanael R Briggs
*Assistant Examiner* — William Peterson
(74) *Attorney, Agent, or Firm* — Brooks Kushman P.C.

(57) ABSTRACT

The present invention provides an array substrate, a color film substrate, and a display device. The array substrate includes a first substrate and a switch unit arranged on the first substrate, and further includes a first alignment layer arranged on the switch unit, and the first alignment layer includes a first alignment unit and a second alignment unit arranged alternately. An alignment direction of the first alignment unit is perpendicular to an alignment direction of the second alignment unit. The color film substrate includes a second substrate and a color photoresist layer arranged on the second substrate, and further includes a second alignment layer arranged on the color photoresist layer, and the second alignment layer includes a first alignment area and a
(Continued)

second alignment area arranged alternately. An alignment direction of the first alignment area is perpendicular to an alignment direction of the second alignment area.

17 Claims, 4 Drawing Sheets

(51) Int. Cl.
  *G02F 1/1337* (2006.01)
  *G02F 1/1343* (2006.01)
  *G02F 1/1368* (2006.01)
(52) U.S. Cl.
  CPC .. *G02F 1/133512* (2013.01); *G02F 1/133753* (2013.01); *G02F 2001/133562* (2013.01); *G02F 2001/133757* (2013.01)
(58) Field of Classification Search
  USPC .......................................................... 349/43
  See application file for complete search history.

(56) References Cited

U.S. PATENT DOCUMENTS

2012/0026209 A1* 2/2012 Wang ................. G02F 1/133514
  345/690
2013/0265532 A1* 10/2013 Kim .................. G02F 1/133753
  349/124

FOREIGN PATENT DOCUMENTS

| CN | 202110356 U | 1/2012 |
| CN | 103412441 A | 11/2013 |
| JP | 06235919 A | 8/1994 |
| JP | 2004133334 A | 4/2004 |

OTHER PUBLICATIONS

PCT International Search Report and Written Opinion dated May 6, 2014, Application No. PCT/2013/089389, 14 Pages.

\* cited by examiner

Prior Art

ARRAY SUBSTRATE, COLOR FILM SUBSTRATE, AND DISPLAY DEVICE

CROSS-REFERENCE TO RELATED APPLICATION

This application is the U.S. national phase of PCT Application No. PCT/CN2013/089389 filed on Dec. 13, 2013, which claims priority to Chinese Patent Application No. 201310340451.5 filed on Aug. 7, 2013, the disclosures of which are incorporated in their entirety by reference herein.

TECHNICAL FIELD

The present invention relates to the field of display technology, in particular to an array substrate, a color film substrate, and a display device.

BACKGROUND

Figure 1:
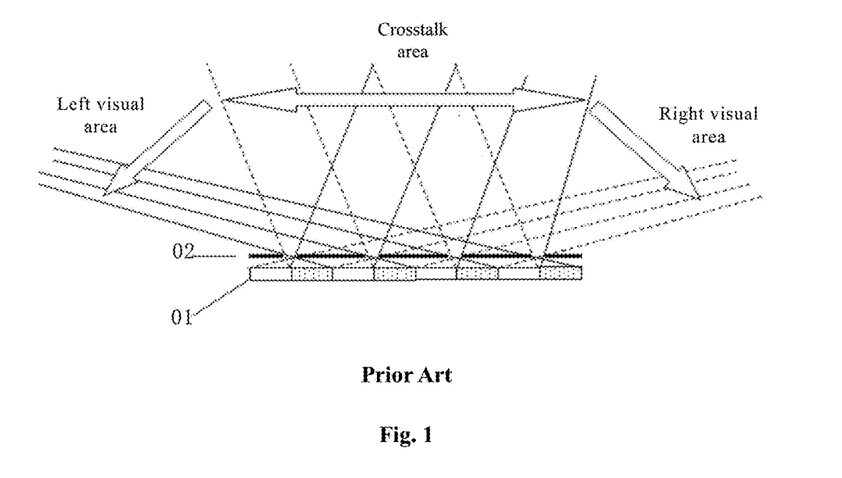
FIG. 1 is a schematic view showing a dual-field display device according to the prior art.

A dual-field display device can display different images at different angles on the same screen, and present them to viewers at different angles of the display device, respectively. Currently, parallax baffle method is the most common technology to achieve dual-field display, and as shown in FIG. 1, the display device comprises a display unit 01, and a slit grating 02 located above the display unit 01. The slit grating 02 is an optical element with transparent stripes and light-shielding stripes arranged alternately. A principle of the dual-field display is that the viewer on the left (at a left visual area) of the display device can only see parts of pixels at the display unit (the pixels shown by hatched portions in FIG. 1) through the slit gating, and the viewer on the right (at a right visual area) of the display device can only see the other parts of the pixels at the display panel (the pixels shown by no-hatched portions in FIG. 1). Signals of different images are input into the pixels which can be seen by the viewer on the left and the pixels which can be seen by the viewer on the right, respectively. As a result, it is able to achieve the dual-field display effect.

However, during the dual-field display of the dual-field display device, inevitably the light from the left visual area will enter the right visual area, and the light from the right visual area will enter the left visual area, i.e., there will be mutual crosstalk due to a crosstalk area. As a result, the display effect of the dual-field display device will be affected.

SUMMARY

An object of embodiments of the present invention is to provide an array substrate, a color film substrate, a display device, and methods for manufacturing an alignment layer, so as to reduce the crosstalk between a left visual area and a right visual area, thereby to improve the display effect of a dual-field display device.

In one aspect, an embodiment of the present invention provides an array substrate, comprising a first substrate and a switch unit arranged on the first substrate. The array substrate further comprises a first alignment layer arranged on the switch unit, and the first alignment layer includes a first alignment unit and a second alignment unit arranged alternately. An alignment direction of the first alignment unit is perpendicular to an alignment direction of the second alignment unit.

The array substrate further comprises a first transparent electrode layer connected to the switch unit. The first alignment layer is located at a side of the first transparent electrode layer away from the first substrate, and the first alignment layer is in contact with the first transparent electrode layer. The switch unit may be a Thin Film Transistor (TFT).

In another aspect, an embodiment of the present invention provides a color film substrate, comprising a second substrate and a color photoresist layer arranged on the second substrate. The color film substrate further comprises a second alignment layer arranged on the color photoresist layer, and the second alignment layer includes a first alignment area and a second alignment area arranged alternately. An alignment direction of the first alignment unit is perpendicular to an alignment direction of the second alignment unit.

The color film substrate further comprises a second transparent electrode layer arranged between the color photoresist layer and the second alignment layer. The second alignment layer is located at a side of the second transparent electrode layer away from the color photoresist layer, and the second alignment layer is in contact with the second transparent electrode layer.

The color film substrate further comprises a black matrix arranged between the second substrate and the second alignment layer, and the black matrix includes a plurality of opening areas in which the color photoresist layer is formed.

In yet another aspect, an embodiment of the present invention provides a display device, comprising the above-mentioned array substrate and color film substrate arranged opposite to each other, and liquid crystals filled between the color film substrate and the array substrate. The second alignment unit of the first alignment layer corresponds to the second alignment area of the second alignment layer, and the second alignment unit of the first alignment layer corresponds to the second alignment area of the second alignment layer. An alignment direction of the first alignment unit of the first alignment layer is perpendicular to an alignment direction of the first alignment area of the second alignment layer, and an alignment direction of the second alignment unit of the first alignment layer is perpendicular to an alignment direction of the second alignment area of the second alignment layer.

The liquid crystals may be twisted nematic liquid crystals. The display device further comprises a slit grating arranged at a side of the color film substrate away from the liquid crystals.

In yet another aspect, an embodiment of the present invention provides a method for manufacturing an alignment layer, used for manufacturing the array substrate or the color film substrate, comprising: applying an alignment film onto a substrate; forming a first alignment pattern having a first alignment direction using a single-exposure alignment process; and forming a second alignment pattern having a second alignment direction using the single-exposure alignment process. The first alignment pattern and the second alignment pattern are arranged alternately, and the first alignment direction is perpendicular to the second alignment direction.

In yet another aspect, an embodiment of the present invention provides a method for manufacturing an alignment layer, used for manufacturing the array substrate or the color film substrate, comprising: applying an alignment film onto a substrate; exposing a first area and shielding a second area using a baffle, performing rubbing alignment on the first area to form a first alignment pattern having a first alignment direction; and exposing the second area and shielding the first area using a baffle, performing rubbing alignment on the second area to form a second alignment pattern having a second alignment direction. The first alignment pattern and the second alignment pattern are arranged alternately, and the first alignment direction is perpendicular to the second alignment direction.

According to the array substrate, the color film substrate, the display device and the methods for manufacturing the alignment layer of embodiments of the present invention, the array substrate comprises the first substrate and the switch unit arranged on the first substrate, and further comprises the first alignment layer arranged on the switch unit, and the first alignment layer includes the first unit and second alignment unit arranged alternately. An alignment direction of the first alignment unit is perpendicular to an alignment direction of the second alignment unit. The color film substrate comprises the second substrate and the color photoresist layer arranged on the second substrate, and further comprises the second alignment layer arranged on the color photoresist layer, and the second alignment layer includes the first and second alignment areas arranged alternately. An alignment direction of the first alignment is perpendicular to an alignment direction of the second alignment area. In embodiments of the present invention, the alignment direction of the first alignment unit of the array substrate is perpendicular to the alignment direction of the second alignment unit of the array substrate, and the alignment direction of the first alignment area of the color film substrate is perpendicular to the alignment direction of the second alignment area of the color film substrate. Hence, for the display device obtained by the array substrate and the color film substrate in a box, the first alignment unit of the first alignment layer corresponds to the first alignment area of the second alignment layer, the second alignment unit of the first alignment layer corresponds to the second alignment area of the second alignment layer, the alignment direction of the first alignment unit of the first alignment layer is perpendicular to the alignment direction of the first alignment area of the second alignment layer, and the alignment direction of second alignment unit of the first alignment layer is perpendicular to the alignment direction of the second alignment area of the second alignment layer. As a result, when the display device is working, it can emit the light in two polarization directions. In addition, because the twisted nematic liquid crystals in the display device have a narrow viewing angle, it is able to reduce the light from a left visual area into a right visual area and reduce the light from the right visual area into the left visual area, thereby to reduce the crosstalk between the left and right visual areas, and improve the display effect of the dual-field display device.

BRIEF DESCRIPTION OF THE DRAWINGS

In order to make the technical solutions of the present invention and the prior art more apparent, the present invention and the prior art will be described hereinafter in conjunction with the drawings. Obviously, the drawings merely refer to some embodiments of the present invention, and a person skilled in the art, without any inventive effort, may obtain the other drawings according to those mentioned hereinafter.

DETAILED DESCRIPTION

The technical solutions of the present invention will be described hereinafter in conjunction with the drawings and the embodiments. Obviously, the followings are merely a part of, rather than all, the embodiments of the present application, and based on these embodiments, a person skilled in the art can obtain, without any inventive effort, the other embodiments, which shall also be considered as falling within the scope of the present invention.

It is to be noted that, the words "on/above" and "under/below" are merely used to describe the present invention with reference to the drawings, but cannot be construed as limitations thereto.

An embodiment of the present invention provides an array substrate comprising a first substrate and a switch unit arranged on the first substrate, and the array substrate further comprises a first alignment layer arranged on the switch unit, and the first alignment layer includes a first alignment unit and a second alignment unit arranged alternately. An alignment direction of the first alignment unit is perpendicular to an alignment direction of the second alignment unit.

Figure 2:
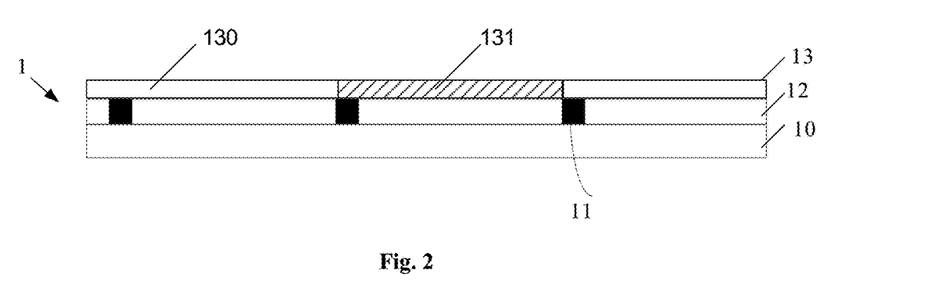
FIG. 2 is a schematic view showing an array substrate according to an embodiment of the present invention.

As shown in FIG. 2, the embodiment of the present invention provides the array substrate 1. The array substrate 1 comprises the first substrate 10, the switch unit 11 arranged on the first substrate 10, and the first alignment layer 13 arranged on the switch unit 11. The first substrate is made of alkali-free glass. This is because the alkali-free glass has a large amount of metal impurities such as aluminum, barium and sodium, and these metal impurities will diffuse easily during the high-temperature treatment. Also, the first substrate may be made of any other transparent materials, such as quartz and plastics, which will not be limited herein. The switch unit 11 may be a TFT or a diode, which will not limited herein either. The first alignment layer 13 includes the first alignment unit 130 and the second alignment unit 131 arranged alternately. The alignment direction of the first alignment unit 130 is perpendicular to the alignment direction of the second alignment unit 131.

Further, the array substrate 1 comprises a first transparent electrode layer 12 connected to the switch unit 11. The first alignment layer 13 is located at a side of the first transparent electrode layer 12 away from the first substrate 10, and the first alignment layer 13 is in contact with the first transparent electrode layer 12. The switch unit 11 may be a TFT.

Figure 3:
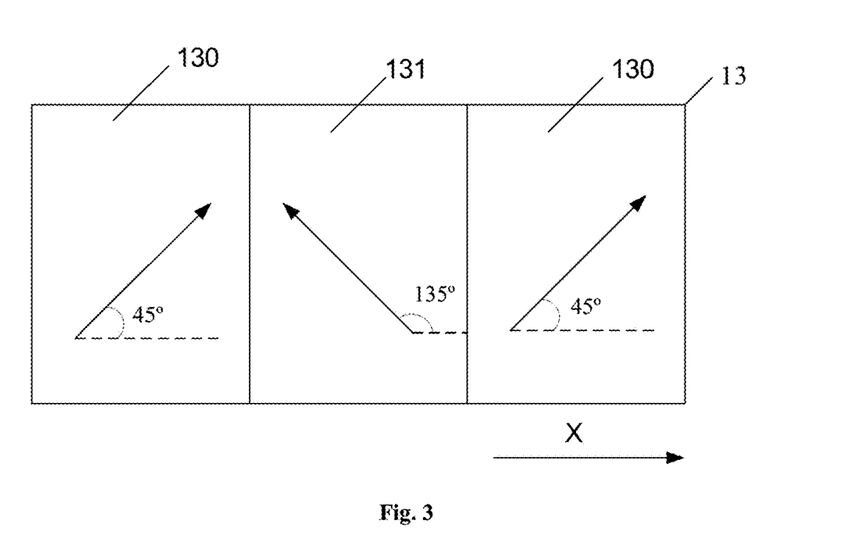
FIG. 3 is a top view showing a first alignment unit and a second alignment unit according to an embodiment of the present invention.

As shown in FIG. 3, the first alignment unit 130 of the first alignment layer 13 may exhibit an angle of 45°, and the second alignment unit 131 of the first alignment layer 13 may exhibit an angle of 135°. To be specific, in an embodiment of the present invention, an angle of counterclockwise rotation is positive relative to an X-axis as shown in FIG. 3 (0°). It is to be noted that, the above angles are for illustrative purposes only, but not used to limit the present invention, as long as the alignment direction of the first alignment unit 130 is perpendicular to the alignment direction of the second alignment unit 131.

An embodiment of the present invention provides a color film substrate comprising a second substrate and a color photoresist layer arranged on the second substrate, and the color film substrate further comprises a second alignment layer arranged on the color photoresist layer. The second alignment layer includes a first alignment area and a second alignment area arranged alternately. The alignment direction of the first alignment area is perpendicular to the alignment direction of the second alignment area.

Figure 4:
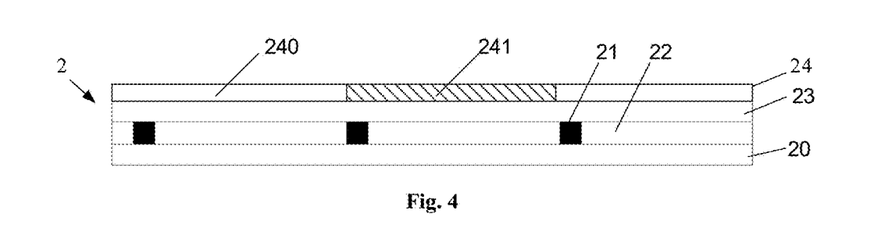
FIG. 4 is a schematic view showing a color film substrate according to an embodiment of the present invention.

As shown in FIG. 4, an embodiment of the present invention provides the color film substrate 2. The color film substrate 2 comprises the second substrate 20, the color photoresist layer 22 arranged on the second substrate 20 and the second alignment layer 24 arranged on the color photoresist layer 22. The second substrate is made of alkali-free glass. This is because the alkali-free glass has a large amount of metal impurities such as aluminum, barium and sodium, and these metal impurities will diffuse easily during the high-temperature treatment. Also, the second substrate may be made of any other transparent materials, such as quartz and plastics, which will not be limited herein. The second alignment layer 24 includes the first alignment area 240 and the second alignment area 241 arranged alternately. The alignment direction of the first alignment area 240 is perpendicular to the alignment direction of the second alignment area 241.

Further, the color film substrate 2 comprises a second transparent electrode layer 23 arranged between the color photoresist layer 22 and the second alignment layer 24. The second alignment layer 24 is located at a side of the second transparent electrode layer 23 away from the color photoresist layer 22, and the second alignment layer 24 is in contact with the second transparent electrode layer 23.

Further, the color film substrate 2 comprises a black matrix 21 arranged between the second substrate 20 and the second transparent electrode layer 23 and including a plurality of opening areas in which the color photoresist layer 22 is formed.

Figure 5:
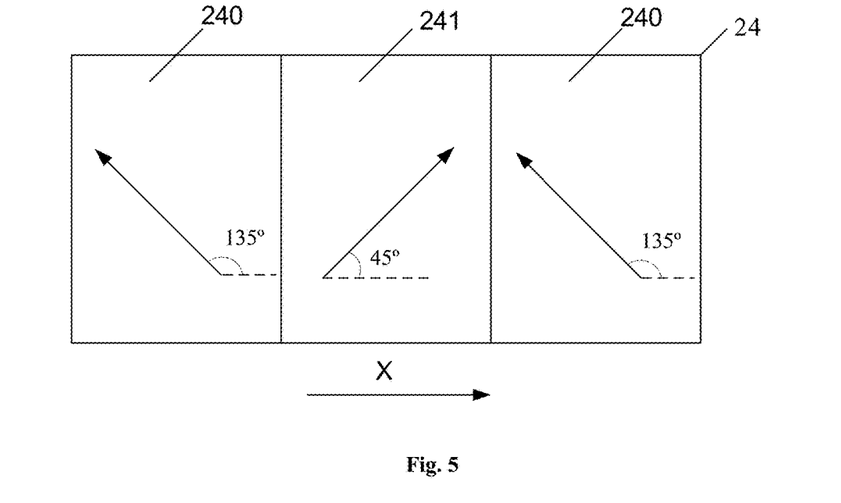
FIG. 5 is a top view showing a first alignment area and a second alignment area according to an embodiment of the present invention.

As shown in FIG. 5, the first alignment area 240 of the second alignment layer 24 may exhibit an angle of 135°, and the second alignment area 241 of the second alignment layer 24 may exhibit an angle of 45°. To be specific, in an embodiment of the present invention, an angle of counterclockwise rotation is positive relative to an X-axis as shown in FIG. 5 (0°). It is to be noted that, the above angles are for illustrative purposes only, but not used to limit the present invention, as long as the alignment direction of the first alignment area 240 is perpendicular to the alignment direction of the second alignment area 241.

According to the array substrate and the color film substrate of embodiments of the present invention, the array substrate comprises the first substrate and the switch unit arranged on the first substrate, and further comprises the first alignment layer arranged on the switch unit. The first alignment layer includes the first and second alignment units arranged alternately. The alignment direction of the first alignment unit is perpendicular to the alignment direction of the second alignment unit. The color film substrate comprises the second substrate and the color photoresist layer arranged on the second substrate, and further comprises the second alignment layer arranged on the color photoresist layer. The second alignment layer includes the first and second alignment areas arranged alternately. The alignment direction of the first alignment area is perpendicular to the alignment direction of the second alignment area. In embodiments of the present invention, the alignment direction of the first alignment unit of the array substrate is perpendicular to the alignment direction of the second alignment unit, and the alignment direction of the first alignment area of the color film substrate is perpendicular to the alignment direction of the second alignment area. Hence, for the display device obtained by the array substrate and the color film substrate in a box, the first alignment unit corresponds to the first alignment area, the second alignment unit corresponds to the second alignment area, the alignment direction of the first alignment unit is perpendicular to the alignment direction of the first alignment area, and the alignment direction of second alignment unit is perpendicular to the alignment direction of the second alignment area. As a result, when the display device is working, it can emit the light in two polarization directions. In addition, because the twisted nematic liquid crystals in the display device have a narrow viewing angle, it is able to reduce the light from a left visual area into a right visual area and reduce the light from the right visual area into the left visual area, thereby to reduce the crosstalk between the left and right visual areas, and improve the display effect of the dual-field display device.

Figure 6:
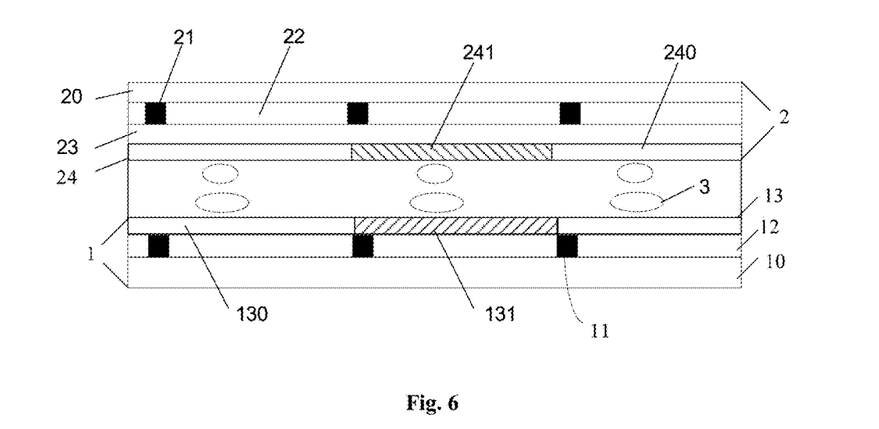
FIG. 6 is a schematic view showing a display device according to an embodiment of the present invention.

As shown in FIG. 6, an embodiment of the present invention provides a display device, comprising the array substrate 1 and the color film substrate 2 arranged opposite to each other, as well as liquid crystals 3 filled between the color film substrate 2 and the array substrate 1. The structures of the array substrate 1 and the color film substrate 2 are the same as mentioned above, and they will not be repeated herein.

It is to be noted that, the first alignment unit 130 of the array substrate 1 corresponds to the first alignment area 240 of the color film substrate 2, and the second alignment unit 131 of the array substrate 1 corresponds to the second alignment area 241 of the color film substrate. In addition, the alignment direction of the first alignment unit 130 is perpendicular to the alignment direction of the first alignment area 240, and the alignment direction of the second alignment unit 131 is perpendicular to the alignment direction of the second alignment area 241. The liquid crystals 3 may be twisted nematic liquid crystals.

Figure 7:
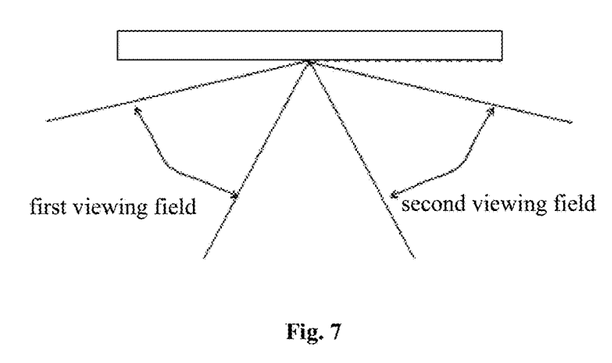
FIG. 7 is a schematic view showing a viewing field according to an embodiment of the present invention.

As shown in FIG. 7, when the display device is driven to display, according to the narrow viewing angle of the twisted nematic liquid crystals, subpixels to be viewed at a first viewing field will be configured with a well viewing angle, and subpixels not to be viewed at the first viewing field will be configured with a poor viewing angle. For example, the alignment direction of the first alignment unit corresponding to an area to be viewed at the first viewing field may be set as 135° and the alignment of the first alignment area may be set as 45°, while the alignment direction of the second alignment unit corresponding to an area not to be viewed may be set as 45° and the alignment direction of the second alignment area may be set as 135°. For a second viewing field, the viewing angle may be set in a similar manner. As a result, it is able to reduce the light from the left visual area into the right visual area and reduce the light from the right visual area into the left visual area, thereby to reduce the crosstalk between the left and right visual areas and improve the display effect of the display device.

Figure 8:
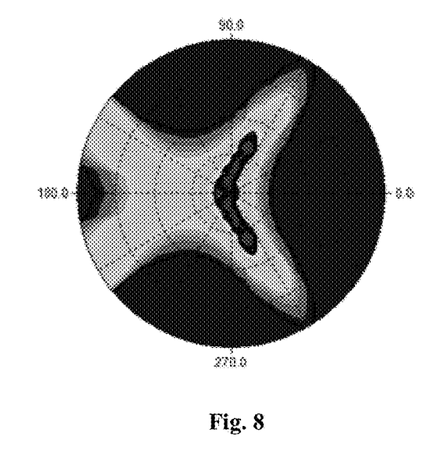
FIG. 8 is a first mimic view showing a viewing angle according to an embodiment of the present invention.
Figure 9:
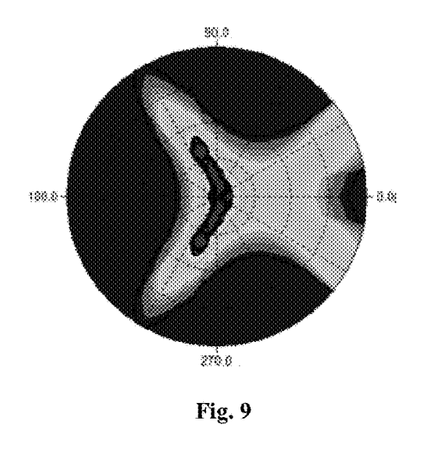
FIG. 9 is a second mimic view showing the viewing angle according to an embodiment of the present invention.

FIG. 8 is a mimic view showing the viewing angle for the structure consisting of the first alignment unit and the first alignment area, and FIG. 9 is a mimic view showing the viewing angle for the structure consisting of the second alignment unit and the second alignment area. As shown in FIG. 8, for the structure consisting of the first alignment unit and the first alignment area, there is a wide area in the left semicircle that has high contrast (the no-hatched portion in FIG. 8), while as shown in FIG. 9, for the structure consisting of the second alignment unit and the second alignment area, there is a wide area in the right semicircle that has high contrast (the no-hatched portion in FIG. 9). Hence, the area in the left semicircle that has high contrast in FIG. 8 just corresponds to the first viewing field in FIG. 7 and the area in the right semicircle that has low contrast in FIG. 8 just corresponds to the second viewing field in FIG. 8, while the area in the left semicircle that has low contrast in FIG. 9 just corresponds to the first viewing field in FIG. 7 and the area in the right semicircle that has high contrast in FIG. 9 just corresponds to the second viewing field in FIG. 7. As a result, it is able to reduce the light from the left visual area into the right visual area and reduce the light from the right visual area into the left visual area, thereby to reduce the crosstalk between the left and right visual areas and improve the display effect of the display device.

Further, the display device comprises a slit grating arranged at a side of the color film substrate 2 away from the liquid crystals 3. The slit grating can further shield the light toward the right visual area for the viewer at the left visual area, and shield the light toward the left visual area for the viewer at the right visual area.

It is to be noted that, the display device may be any product or member that has the display function, e.g., a liquid crystal panel, a mobile phone, a tablet PC, a TV, a display device, a laptop PC, a digital photo frame, and a navigator.

The display device of embodiments of the present invention comprises the array substrate and the color film substrate arranged opposite to each other, and the liquid crystals filled therebetween. The array substrate comprises the first substrate and the switch unit arranged on the first substrate, and further comprises the first alignment layer arranged on the switch unit. The first alignment layer includes the first and second alignment units arranged alternately. The alignment direction of the first alignment unit is perpendicular to the alignment direction of the second alignment unit. The color film substrate comprises the second substrate and the color photoresist layer arranged on the second substrate, and further comprises the second alignment layer arranged on the color photoresist layer. The second alignment layer includes the first and second alignment areas arranged alternately. The alignment direction of the first alignment unit is perpendicular to the alignment direction of the second alignment unit. In embodiments of the present invention, the alignment direction of the first alignment unit of the array substrate is perpendicular to the alignment direction of the second alignment unit of the array substrate, and the alignment direction of the first alignment area of the color film substrate is perpendicular to the alignment direction of the second alignment area of the color film substrate. Hence, for the display device obtained by the array substrate and the color film substrate in a box, the first alignment unit corresponds to the first alignment area, the second alignment unit corresponds to the second alignment area, the alignment direction of the first alignment unit is perpendicular to the alignment direction of the first alignment area, and the alignment direction of second alignment unit is perpendicular to the alignment direction of the second alignment area. As a result, when the display device is working, it can emit the light in two polarization directions. In addition, because the twisted nematic liquid crystals in the display device have a narrow viewing angle, it is able to reduce the light from a left visual area into a right visual area and reduce the light from the right visual area into the left visual area, thereby to reduce the crosstalk between the left and right visual areas, and improve the display effect of the dual-field display device.

Figure 10:
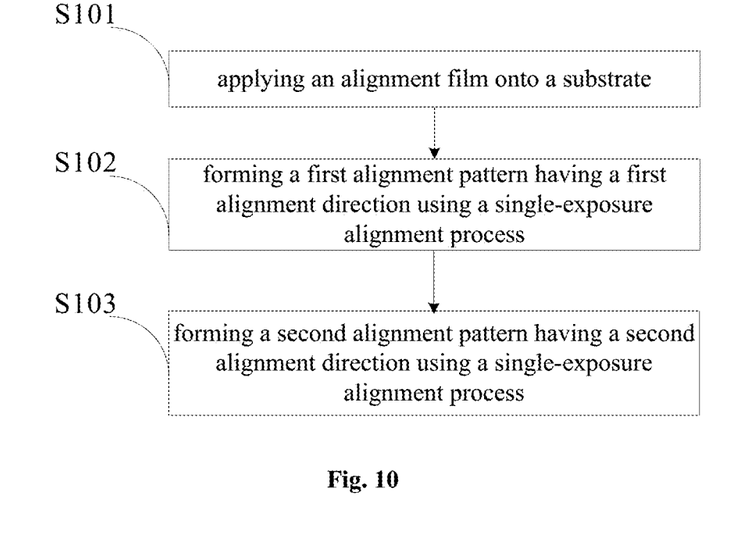
FIG. 10 is a first flow chart of a method for manufacturing an alignment layer according to an embodiment of the present invention.

An embodiment of the present invention provides a method for manufacturing an alignment layer, used for manufacturing the above-mentioned array substrate or color film substrate, which, as shown in FIG. 10, comprises the following steps.

Step S101: applying an alignment film onto a substrate. The substrate is made of alkali-free glass. This is because the alkali-free glass has a large amount of metal impurities such as aluminum, barium and sodium, and these metal impurities will diffuse easily during the high-temperature treatment. Also, the first substrate may be made of any other transparent materials, such as quartz and plastics, which will not be limited herein. During the process of manufacturing the alignment layer, at first it is required to apply the alignment film to be treated onto the substrate.

Step S102: forming a first alignment pattern having a first alignment direction using a single-exposure alignment process. To be specific, a mask is arranged above the alignment film so as to expose a first area and shield a second area, thereby to perform exposure alignment on the alignment film with the polarization light having the first alignment direction.

Step S103: forming a second alignment pattern having a second alignment direction using a single-exposure alignment process. To be specific, the mask is arranged above the alignment film so as to expose the second area and shield the first area, thereby to perform the exposure alignment on the alignment film with the polarization light having the second alignment direction. The first alignment pattern and the second alignment pattern are arranged alternately, and the first alignment direction is perpendicular to the second alignment direction.

It is to be noted that, in this embodiment, the order of steps S102 and S103 is not defined, i.e., step S102 may be performed prior to, or subsequent to, step S103.

Figure 11:
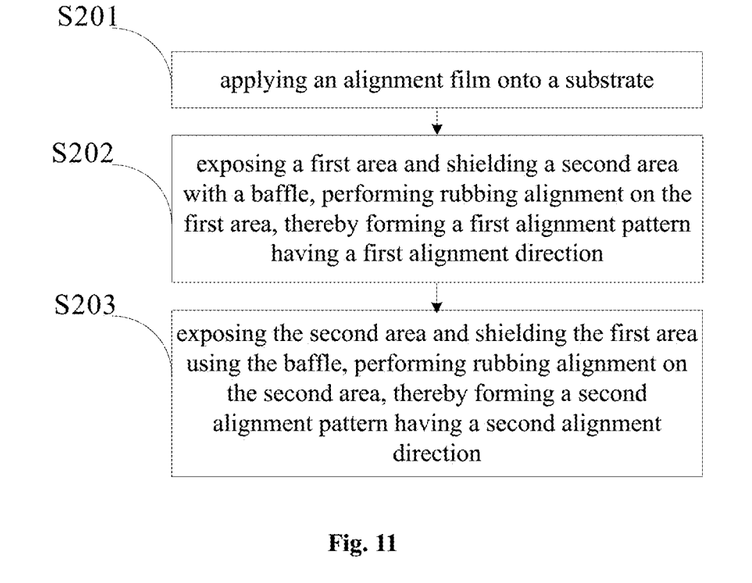
FIG. 11 is a second flow chart of the method for manufacturing the alignment layer according to an embodiment of the present invention.

An embodiment of the present invention further provides a method for manufacturing an alignment layer, used for manufacturing the above-mentioned array substrate or color film substrate, which, as shown in FIG. 11, comprises the following steps.

Step S201: applying an alignment film onto a substrate. The substrate is made of alkali-free glass. This is because the alkali-free glass has a large amount of metal impurities such as aluminum, barium and sodium, and these metal impurities will diffuse easily during the high-temperature treatment. Also, the first substrate may be made of any other transparent materials, such as quartz and plastics, which will not be limited herein. During the manufacturing of the alignment layer, at first it is required to apply the alignment film to be treated onto the substrate.

Step S202: exposing a first area and shielding a second area with a baffle, performing rubbing alignment on the first area, thereby forming a first alignment pattern having a first alignment direction. To be specific, the baffle is arranged above the alignment film so as to expose the first area and shield the second area, thereby to perform the rubbing alignment on the first area along the first alignment direction.

Step S203: exposing the second area and shielding the first area using the baffle, performing rubbing alignment on the second area, thereby forming a second alignment pattern having a second alignment direction. To be specific, the baffle is arranged above the alignment film so as to expose the second area and shield the first area, thereby to perform the rubbing alignment on the second area along the second alignment direction. The first alignment pattern and the second alignment pattern are arranged alternately, and the first alignment direction is perpendicular to the second alignment direction.

It is to be noted that, in this embodiment, the order of steps S202 and S203 is not defined, i.e., step S202 may be performed prior to, or subsequent to, step S203.

The above-mentioned methods may be used for manufacturing the first alignment layer of the array substrate and the second alignment layer of the color film substrate.

When manufacturing the array substrate and the color film substrate, the above-mentioned methods for manufacturing the alignment layer may be applied. In embodiments of the present invention, the alignment direction of the first alignment unit of the array substrate is perpendicular to the alignment direction of the second alignment unit of the array substrate, and the alignment direction of the first alignment area of the color film substrate is perpendicular to the alignment direction of the second alignment area of the color film substrate. Hence, for the display device obtained by the array substrate and the color film substrate in a box, the first alignment unit corresponds to the first alignment area, the second alignment unit corresponds to the second alignment area, the alignment direction of the first alignment unit is perpendicular to the alignment direction of the first alignment area, and the alignment direction of second alignment unit is perpendicular to the alignment direction of the second alignment area. As a result, when the display device is working, it can emit the light in two polarization directions. In addition, because the twisted nematic liquid crystals in the display device have a narrow viewing angle, it is able to reduce the light from a left visual area into a right visual area and reduce the light from the right visual area into the left visual area, thereby to reduce the crosstalk between the left and right visual areas, and improve the display effect of the dual-field display device.

The above are merely the preferred embodiments of the present invention. It should be noted that, a person skilled in the art may make further improvements and modifications without departing from the principle of the present invention, and these improvements and modifications shall also fall within the scope of the present invention.

What is claimed is:

1. An array substrate, comprising a first substrate and a plurality of switch units arranged on the first substrate, further comprising:
   a first alignment layer arranged on the switch unit,
   wherein the first alignment layer comprises a first alignment unit and a second alignment unit arranged alternately, and an alignment direction of the first alignment unit is perpendicular to an alignment direction of the second alignment unit;
   each pixel comprises the first alignment unit and the second alignment unit, for a structure consisting of the first alignment unit and a first alignment area, there is a wide area in a left semicircle that has high contrast, for a structure consisting of the second alignment unit and a second alignment area, there is a wide area in a right semicircle that has high contrast, an area in the left semicircle that has high contrast corresponds to a first viewing field and an area in the right semicircle that has low contrast corresponds to a second viewing field, while an area in the left semicircle that has low contrast corresponds to the first viewing field and an area in the right semicircle that has high contrast corresponds to the second viewing field;
   the alignment direction of the first alignment unit or the second alignment unit in each pixel is the same, and for two adjacent pixels, the alignment direction of the first alignment unit is perpendicular to the alignment direction of the second alignment unit, so as to reduce lights from a left visual area into a right visual area and reduce lights from the right visual area into the left visual area;
   wherein pixels corresponding to the first alignment unit and the second alignment unit are alternately arranged, wherein each pixel corresponds to only one of the first alignment unit and the second alignment unit, in an area corresponding to each pixel, the alignment direction of the first alignment unit is directed in one direction only and the alignment direction of the second alignment unit is directed in one direction only, and each pixel is corresponding to one of the plurality of switch units.

2. The array substrate according to claim 1, further comprising:
   a first transparent electrode layer connected to the switch unit,
   wherein the first alignment layer is located at a side of the first transparent electrode layer away from the first substrate, and the first alignment layer is in contact with the first transparent electrode layer.

3. The array substrate according to claim 1, wherein the switch unit is a Thin Film Transistor.

4. A color film substrate, comprising a second substrate and a color photoresist layer arranged on the second substrate, further comprising:
   a second alignment layer arranged on the color photoresist layer
   wherein the second alignment layer comprises a first alignment area and a second alignment area arranged alternately, and an alignment direction of the first alignment area is perpendicular to an alignment direction of the second alignment area, for a structure consisting of a first alignment unit and the first alignment area, there is a wide area in a left semicircle that has high contrast, for a structure consisting of a second alignment unit and the second alignment area, there is a wide area in a right semicircle that has high contrast, an area in the left semicircle that has high contrast corresponds to a first viewing field and an area in the right semicircle that has low contrast corresponds to a second viewing field, while an area in the left semicircle that has low contrast corresponds to the first viewing field and an area in the right semicircle that has high contrast corresponds to the second viewing field;
   the alignment direction of the first alignment area or the second alignment area in each pixel is the same, and for two adjacent pixels, the alignment direction of the first alignment area is perpendicular to the alignment direction of the second alignment area, so as to reduce lights from a left visual area into a right visual area and reduce lights from the right visual area into the left visual area;

wherein pixels corresponding to the first alignment unit and the second alignment unit are alternately arranged, wherein each pixel corresponds to only one of the first alignment unit and the second alignment unit, in an area corresponding to each pixel, the alignment direction of the first alignment unit is directed in one direction only and the alignment direction of the second alignment unit is directed in one direction only, and each pixel is corresponding to one of a plurality of switch units.

5. The color film substrate according to claim 4, further comprising:
a second transparent electrode layer arranged between the color photoresist layer and the second alignment layer,
wherein the second alignment layer is located at a side of the second transparent electrode layer away from the color photoresist layer, and the second alignment layer is in contact with the second transparent electrode layer.

6. The color film substrate according to claim 4, further comprising:
a black matrix arranged between the second substrate and the second alignment layer,
wherein the black matrix comprises a plurality of opening areas, and the color photoresist layer is formed in the plurality of opening areas.

7. A display device, comprising the array substrate according to claim 1, a color film substrate comprising a second substrate and a color photoresist layer arranged on the second substrate, further comprising:
a second alignment layer arranged on the color photoresist layer;
wherein the second alignment layer comprises a first alignment area and a second alignment area arranged alternately, and an alignment direction of the first alignment area is perpendicular to an alignment direction of the second alignment area, and
a second transparent electrode layer arranged between the color photoresist layer and the second alignment layer, wherein the second alignment layer is located at a side of the second transparent electrode layer away from the color photoresist layer, and the second alignment layer is in contact with the second transparent electrode layer, and liquid crystals filled between the color film substrate and the array substrate, wherein
the first alignment unit of the first alignment layer corresponds to the first alignment area of the second alignment layer, the second alignment unit of the first alignment layer corresponds to the second alignment area of the second alignment layer,
an alignment direction of the first alignment unit of the first alignment layer is perpendicular to an alignment direction of the first alignment area of the second alignment layer, and an alignment direction of the second alignment unit of the first alignment layer is perpendicular to an alignment direction of the second alignment area of the second alignment layer, so as to emit lights in two polarization directions, reduce lights from a left visual area into a right visual area and reduce lights from the right visual area into the left visual area.

8. The display device according to claim 7, wherein the liquid crystals are twisted nematic liquid crystals.

9. The display device according to claim 7, further comprising:
a slit grating arranged at a side of the color film substrate away from the liquid crystals.

10. The array substrate according to claim 2, wherein the switch unit is a Thin Film Transistor.

11. The color film substrate according to claim 5, further comprising:
a black matrix arranged between the second substrate and the second alignment layer,
wherein the black matrix comprises a plurality of opening areas, and the color photoresist layer is formed in the plurality of opening areas.

12. The display device according to claim 7, further comprising:
a slit grating arranged at a side of the color film substrate away from the liquid crystals.

13. An array substrate comprising:
a first substrate;
a plurality of switch units disposed on the first substrate; and
a first alignment layer disposed on the switch unit, the first alignment layer comprising a first alignment unit and a second alignment unit arranged alternately, the first alignment unit having an alignment direction perpendicular to an alignment direction of the second alignment unit; wherein
for a structure consisting of the first alignment unit and a first alignment area, there is a wide area in a left semicircle that has high contrast, for a structure consisting of the second alignment unit and a second alignment area, there is a wide area in a right semicircle that has high contrast, an area in the left semicircle that has high contrast corresponds to a first viewing field and an area in the right semicircle that has low contrast corresponds to a second viewing field, while an area in the left semicircle that has low contrast corresponds to the first viewing field and an area in the right semicircle that has high contrast corresponds to the second viewing field;
the alignment direction of the first alignment unit or the second alignment unit in each pixel is the same, and for two adjacent pixels, the alignment direction of the first alignment unit is perpendicular to the alignment direction of the second alignment unit, so as to inhibit light from a left visual area into a right visual area and inhibit light from the right visual area into the left visual area;
wherein pixels corresponding to the first alignment unit and the second alignment unit are alternately arranged, wherein each pixel corresponds to only one of the first alignment unit and the second alignment unit, in an area corresponding to each pixel, the alignment direction of the first alignment unit is directed in one direction only and the alignment direction of the second alignment unit is directed in one direction only, and each pixel is corresponding to one of the plurality of switch units.

14. The array substrate of claim 13, wherein the first alignment layer comprises a third alignment unit, the third alignment unit being arranged adjacent to the second alignment unit, with the second alignment unit being between the first and second alignment units, the third alignment unit having an alignment direction perpendicular to an alignment direction of the second alignment unit.

15. The array substrate according to claim 1, wherein the first alignment unit is corresponding to pixels to be viewed, and the second alignment unit is corresponding to pixels not to be viewed.

16. The color film substrate according to claim 4, wherein the first alignment area is corresponding to pixels to be viewed, and the second alignment area is corresponding to pixels not to be viewed.

17. The array substrate according to claim 13, wherein the first alignment unit is corresponding to pixels to be viewed, and the second alignment unit is corresponding to pixels not to be viewed.

* * * * *